(12) United States Patent
Schneider (10) Patent No.: US 7,815,031 B2
(45) Date of Patent: Oct. 19, 2010

(54) DIRECTIONAL CELL INDEXING MATRIX

(75) Inventor: Phillip J. Schneider, Batavia, OH (US)

(73) Assignee: Agile Systems, Inc., Bethel, OH (US)

( * ) Notice: Subject to any disclaimer, the term of this patent is extended or adjusted under 35 U.S.C. 154(b) by 707 days.

(21) Appl. No.: 11/681,497

(22) Filed: Mar. 2, 2007

(65) Prior Publication Data

US 2007/0205628 A1 Sep. 6, 2007

Related U.S. Application Data (60) Provisional application No. 60/778,298, filed on Mar. 2, 2006.

(51) Int. Cl.
 B65G 1/00 (2006.01)
 B65G 43/08 (2006.01)
 B63B 27/00 (2006.01)
 B63B 35/00 (2006.01)

(52) U.S. Cl. ............... 198/347.1; 198/358; 700/217; 414/143.2; 414/331.02

(58) Field of Classification Search ............. None
 See application file for complete search history.

(56) References Cited

U.S. PATENT DOCUMENTS

| | | |
|---|---|---|
| 2,956,763 A | 10/1960 | D'Arca |
| 3,554,389 A | 1/1971 | Bright |
| 3,622,020 A | 11/1971 | Sarvary |
| 3,664,273 A | 5/1972 | Howe |
| 3,683,821 A | 8/1972 | Mangold |
| 3,800,963 A | 4/1974 | Holland |
| 3,850,109 A | 11/1974 | Thornton |
| 3,860,130 A | 1/1975 | Frangos |
| 3,933,257 A | 1/1976 | Weber |
| 4,098,409 A | 7/1978 | Massey |
| 4,186,841 A | 2/1980 | Buckley et al. |
| 4,480,748 A | 11/1984 | Wind |
| 4,638,744 A | 1/1987 | Clive-Smith |
| 4,662,532 A | 5/1987 | Anderson et al. |
| 4,773,547 A | 9/1988 | Bell |
| 4,878,796 A | 11/1989 | Ammeraal |
| 4,897,012 A | 1/1990 | Brewer |
| 5,271,701 A | 12/1993 | Hopland |
| 5,285,909 A | 2/1994 | Slater |
| 5,329,862 A | 7/1994 | Breezer et al. |
| 5,345,879 A | 9/1994 | Maillard |
| 5,388,532 A | 2/1995 | Wakano |
| 5,395,119 A | 3/1995 | Jacob et al. |

(Continued)

*Primary Examiner*—Gene Crawford
*Assistant Examiner*—Yolanda Cumbess
(74) *Attorney, Agent, or Firm*—Dinsmore & Shohl (57) ABSTRACT

Storage matrixes associated with storage and retrieval systems and methods are provided to automate the process of handling a mixed inventory of palletized and containerized items. In one embodiment, the storage matrix comprises a storage matrix comprising a plurality of stationary cell modules and a plurality of carriers. The outer row cell modules comprise a plurality of motors configured to move the respective carrier bi-directionally within the storage matrix and is also configured to stabilize the respective carrier when the carrier is moving or at a stationary position. The inner row cell modules comprise at least one motor configured to move the respective carriers uni-directionally within the storage matrix and also comprises at least one ferrous metal plate configured to stabilize the respective carrier when the carrier is moving or at a stationary position.

10 Claims, 8 Drawing Sheets

DIRECTIONAL CELL INDEXING MATRIX

U.S. PATENT DOCUMENTS

| | | |
|---|---|---|
| 5,404,821 A | 4/1995 | Bond |
| 5,407,316 A | 4/1995 | Coatta et al. |
| 5,412,863 A | 5/1995 | Prodel |
| 5,415,311 A | 5/1995 | Coogan |
| 5,487,636 A | 1/1996 | Mkrtchyan |
| 5,669,753 A | 9/1997 | Schween |
| 5,707,199 A | 1/1998 | Faller |
| 5,857,413 A | 1/1999 | Ward |
| 5,862,917 A | 1/1999 | Noble et al. |
| 5,915,905 A | 6/1999 | Hopland |
| 6,045,319 A * | 4/2000 | Uchida et al. ............... 414/676 |
| 6,059,521 A | 5/2000 | Rapeli |
| 6,077,019 A | 6/2000 | Corcoran |
| 6,148,752 A | 11/2000 | Upmeyer |
| 6,170,686 B1 | 1/2001 | Flores |
| 6,230,640 B1 | 5/2001 | Nordstrom et al. |
| 6,279,763 B1 | 8/2001 | Bush |
| 6,315,513 B1 | 11/2001 | Harukawa et al. |
| 6,325,224 B1 | 12/2001 | Brown |
| 6,340,136 B1 | 1/2002 | Luria |
| 6,626,612 B2 * | 9/2003 | Knapp .................. 406/19 |
| 6,842,665 B2 * | 1/2005 | Karlen .................. 700/217 |
| 2006/0058912 A1 | 3/2006 | Karlen |

* cited by examiner

FIG. 6B 007-08 # DIRECTIONAL CELL INDEXING MATRIX

CROSS-REFERENCE TO RELATED APPLICATIONS

This application claims priority from U.S. Provisional Patent Application Ser. No. 60/778,298 filed Mar. 2, 2006, the entire disclosure of which is hereby incorporated by reference herein.

TECHNICAL FIELD

The present invention relates generally to a storage matrix associated with an automated stowage and retrieval system designed to accommodate palletized and containerized freight of various dimensions. While the invention has utility in a variety of environments, embodiments are specifically disclosed in connection with a shipboard system for handling cargo and weapons within the holds and magazines of naval vessels or other ships at sea.

BACKGROUND

Cargo and weapons bound for a naval vessel or other type of ship are normally packaged for transportation and stowage in one of two ways: goods are either secured to a pallet or are enclosed in a shipping container. Based on a typical inventory of weapons and stores aboard a current-generation aircraft carrier or other surface combatant, most pallets measure 44 inches in length by 40 inches in height and can weigh as much as 3,800 pounds. Containerized loads, in which the cargo or weapons are fully enclosed in a rigid box, can weigh up to 9,640 pounds, with lengths up to 312 inches. Individual pallets and containers of all types and sizes are handled many times by various crews and equipment and may be restowed in the holds of several different ships before reaching their ultimate point of use.

Such palletized and containerized cargo and weapons payloads are generally first moved from locations in pierside warehouses or weapons storage depots to staging areas on a dock using forklift trucks. They are then hoisted onto the top deck of a shuttle ship or a specialized cargo vessel called an Underway Replenishment (UNREP) ship using conventional cranes. Once aboard the UNREP ship, the pallets and containers are again moved with forklifts, pallet movers, or sometimes cranes to one of several elevators, where they are lowered for stowage into a hold or magazine on one of the vessel's multiple cargo decks.

After descending to the appropriate hold or magazine, each pallet or container is removed from an elevator platform using another forklift truck and is deposited at its particular stowage site in the storeroom, where it is usually stacked on identical pallets or containers to the maximum height permitted by either container capacity or the height of the storeroom ceiling. Each individual load or stack is then manually secured to the deck for safe transit at sea using tie-down straps, chains, nets or blocking. When the time comes to transfer the pallets and containers from the UNREP ship to a surface combatant during transit at sea, the procedure is reversed. After the cargo is delivered to the combatant ship via connected replenishment gear or aircraft, the same procedures are again employed, using a series of lift trucks and elevators to restow the pallets and containers in holds and magazines located below decks.

This stowage and retrieval process is extremely time-consuming, manpower-intensive, and inefficient. For example, during the cargo retrieval process, forklift operators in each hold or weapons magazine must select the pallet or container that has been ordered, manually remove the tie-down straps, chains, nets or other restraining devices that were previously installed to secure it to the hold deck for safe transit at sea, and then pick up the load, maneuver it between the other stored cargo, and deliver it to the elevator trunk. When the elevator platform becomes available, the forklift drives onto the platform and deposits the payload. The elevator often must wait until several of the weapons or cargo payloads requested from that magazine or hold have been acquired and loaded before it can deliver the goods to their destination, delaying parallel activities in the other magazines and holds that the elevator services.

Forklift trucks, which are typically the prime movers for horizontal operations in this entire sequence of events, have certain intrinsic disadvantages for this application. First, they require aisles to be cleared within which to maneuver the payloads, and space to access each with their tines, so the cargo in each hold or magazine is repeatedly rearranged to acquire requested payloads. A considerable amount of floor space must be left vacant to provide sufficient maneuvering room for the forklifts and for temporary cargo staging areas. As a result, payloads cannot be stowed as densely as desired. Second, forklift trucks are by-nature quite heavy themselves and thus place undue stress on the elevator platform and its actuator system when driven onto the freight elevator carrying individual payloads. Third, as discussed, payloads must be unloaded from or loaded onto the freight elevator platform one at a time, so the elevator must wait until each is individually stowed or retrieved. Fourth, forklifts have proved to be quite maintenance-intensive and costly over their service life. Finally, this cargo and weapons stowage and retrieval process must often be performed in high seas, where even the largest surface vessels, such as aircraft carriers, pitch and roll violently. In certain sea states, handling large and heavy palletized and containerized loads with forklift trucks becomes unsafe and the process must be stopped.

Conventional "rack-and-aisle" automated storage and retrieval systems used today in land-based warehouses also have significant limitations. First, these systems are capable of handling payloads of only one size and shape, typically pallets. Second, in order to achieve selective access, i.e., the ability to access any individual payload contained in the system, one fixed, empty aisle must be provided between every two storage racks to provide access to every cargo unit, or empty rack space must be reserved to allow payloads to be shuffled from one rack to another. In either case, high storage density cannot be achieved. Finally, these industrial warehousing systems are not designed for shipboard applications in which the cargo contained is subject to high dynamic loads caused by ship motion and must be restrained at all times.

Despite continuing efforts on the part of the Navy and commercial operators to maximize efficiency in transporting, handling and stowing palletized and containerized cargo and weapons of various sizes and shapes at sea, current systems have limitations in stowage density, speed of access, and securing of payloads. Accordingly, automated stowage and retrieval systems are desired that achieve high three-dimensional stowage density within a given hold or magazine, that permit any payload contained in the storeroom to be accessed, loaded and unloaded on associated service elevators quickly, and/or that automatically secure those payloads for transit in rough seas.

SUMMARY

According to one embodiment, a storage matrix is provided. The storage matrix comprises a plurality of stationary cell modules arranged within the storage matrix, and a plurality of carriers. The cell modules disposed along the outer rows of the matrix comprise a plurality of motors arranged along both planar axes of the storage matrix, and the cell modules disposed along the inner rows of the storage matrix comprise at least one metal plate, for example a ferrous or iron plate, and at least one motor disposed along one of the planar axes of the storage matrix. The plurality of carriers comprise at least one magnet disposed on an underside of each of the carriers, wherein the at least one magnet is configured to engage a motor on the inner row cell modules or the outer row cell modules. In operation, the plurality of motors of each outer row cell module is configured to move the respective carrier bi-directionally within the storage matrix and is also configured to stabilize the respective carrier when the carrier is moving or at a stationary position. In one embodiment, the stabilization is due to magnetic attraction between the magnets, e.g. permanent magnets, on the underside of the moving carrier and the motors, for example, stationary iron-core linear electric motors, or the metal plates. The at least one motor of each inner row cell module is configured to move the respective carriers uni-directionally within the storage matrix and the at least metal plate of each inner cell module is configured to stabilize the respective carrier when the carrier is moving or at a stationary position.

According to another embodiment, a cell module permanently mounted to a portion of a storage matrix is provided. The cell module comprises at least one linear synchronous motor disposed along one of the planar axes of a storage matrix. The cell module also comprises at least one metal plate, for example, a ferrous metal plate, disposed along a portion of the cell module, and a plurality of roller bearings.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Figure 5A:
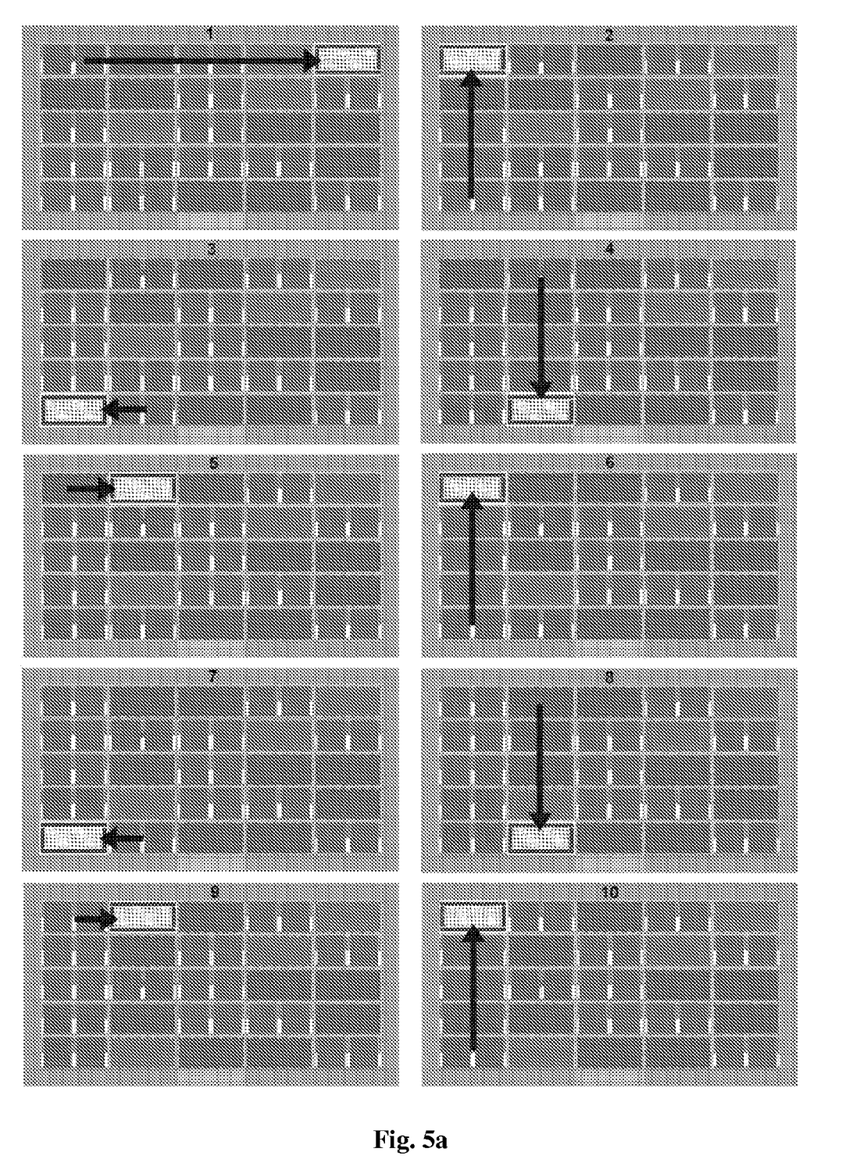
FIGS. 5a and 5b, when viewed consecutively, are schematic plan views illustrating the movement sequence of a plurality of carriers within a storage matrix according to one or more embodiments of the present invention.
Figure 5B:
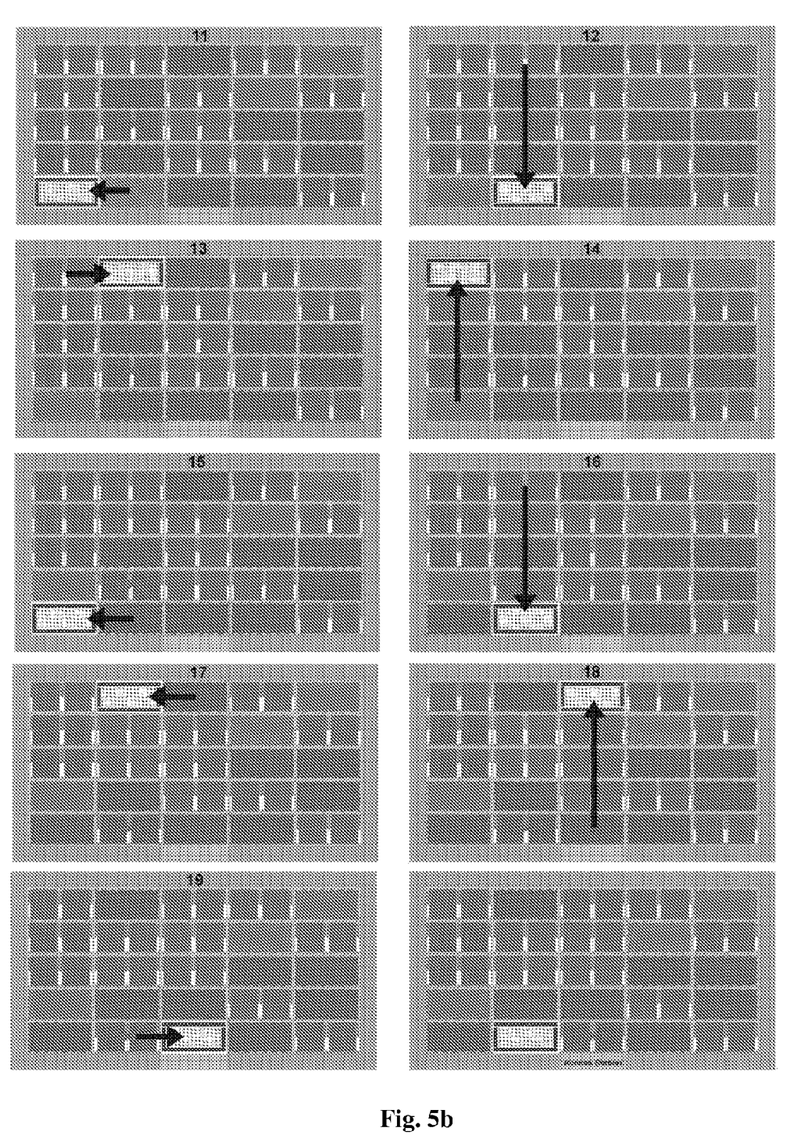

The present invention is directed to maximizing the amount of cargo in a limited three-dimensional space. Referring to FIGS. 5a and 5b, the illustrated embodiment utilizes a modified "slide-puzzle" principle to maximize storage capacity, while facilitating easy access to cargo in an expedited manner. Under the "slide puzzle" principle, a storage area is divided into a storage matrix 1, wherein every cell module 100 comprises a moving carrier and cargo disposed thereon, except for one or two empty cell modules. By using all but one or two cell modules, the storage space may stow more cargo than previously was possible with conventional rack and aisle operations. Further resulting from the one or two empty spaces, the system devises a carrier movement scheme through the use of a computer controlled indexing algorithm based on the "slide puzzle" principle. In this carrier movement scheme, a payload carrier in the back corner of a storage area may be moved to the front of the storage area matrix through the coordinated movement of one or more carriers. For more details on the "slide puzzle" principle, U.S. Pat. No. 6,842,665, and U.S. patent application Ser. No. 11/552,845 are incorporated by reference herein, in its entirety. The system components of the present invention will utilize a modified form of the "slide puzzle" principle, wherein some of the cell modules may only facilitate uni-directional movement of the carriers.

Figure 1:
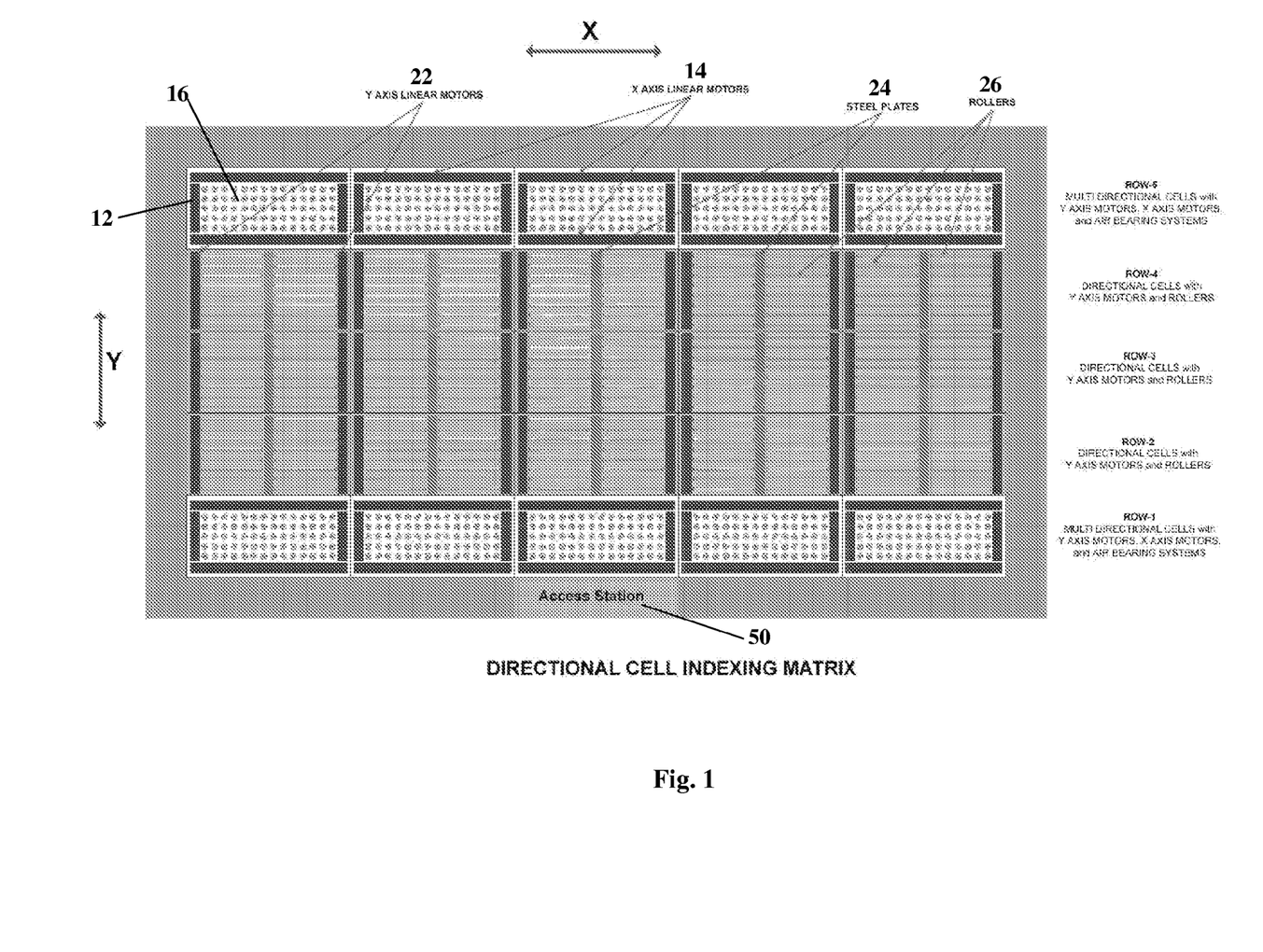
FIG. 1 is a perspective schematic view of a storage matrix according to one or more embodiments of the present invention.

Referring to FIG. 1, the storage matrix 1 comprises a plurality of stationary cell modules arranged in a matrix. The storage matrix 1 may constitute any three dimensional storage location, warehouse, or facility suitable for stowing containers or palletized loads. In an exemplary embodiment, the storage matrix 1 is a hold of a ship, configured to stow cargo, e.g. weapon payloads. The storage matrix embodiment of FIG. 1 is a 5×5 matrix; however, various other matrix sizes and dimensions are contemplated herein. "Payload", as used herein, refers to cargo and supplies, especially cargo such as military pallets comprising bombs, missiles, grenades, and combinations thereof.

Figure 2:
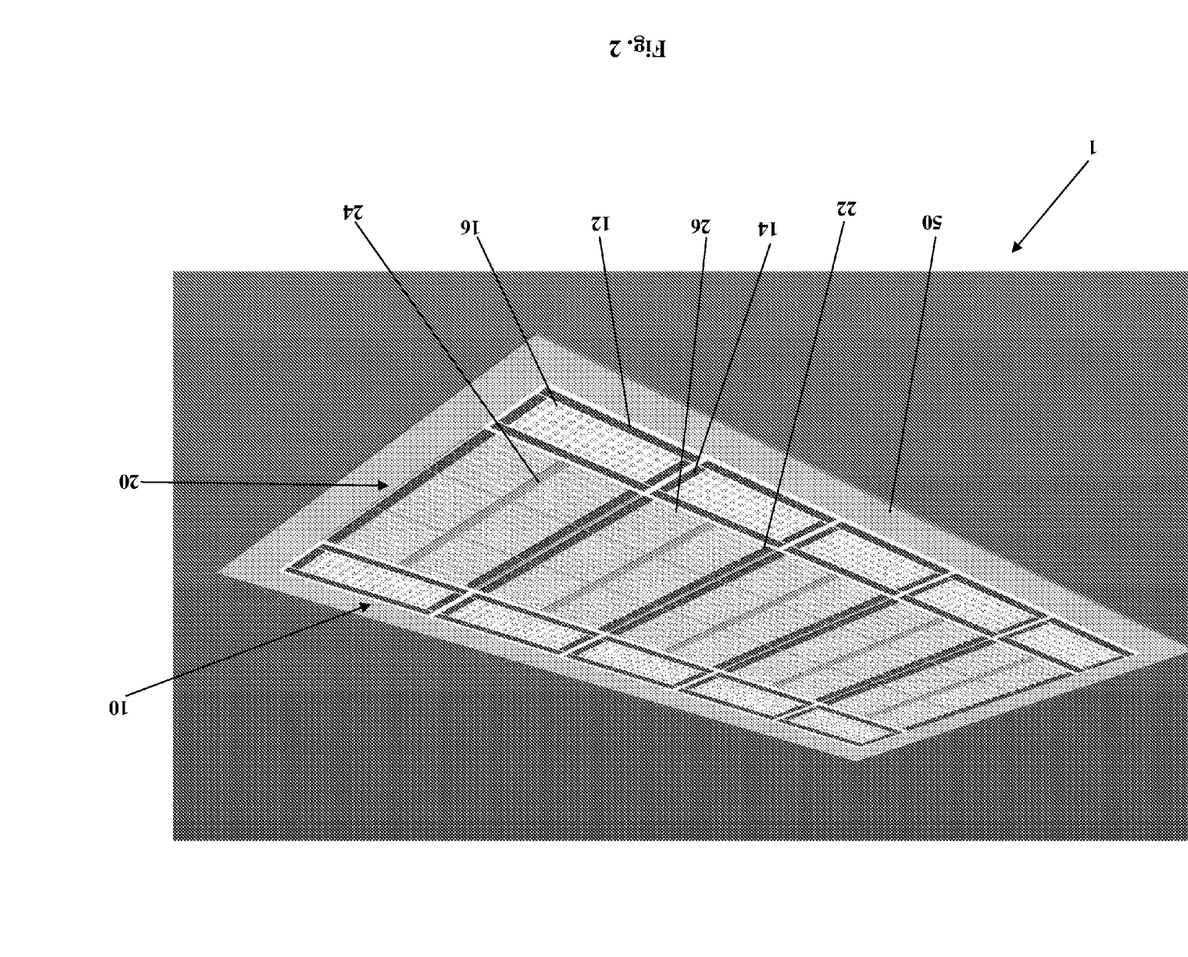
FIG. 2 is a perspective schematic view of a storage matrix according to one or more embodiments of the present invention.
Figure 3:
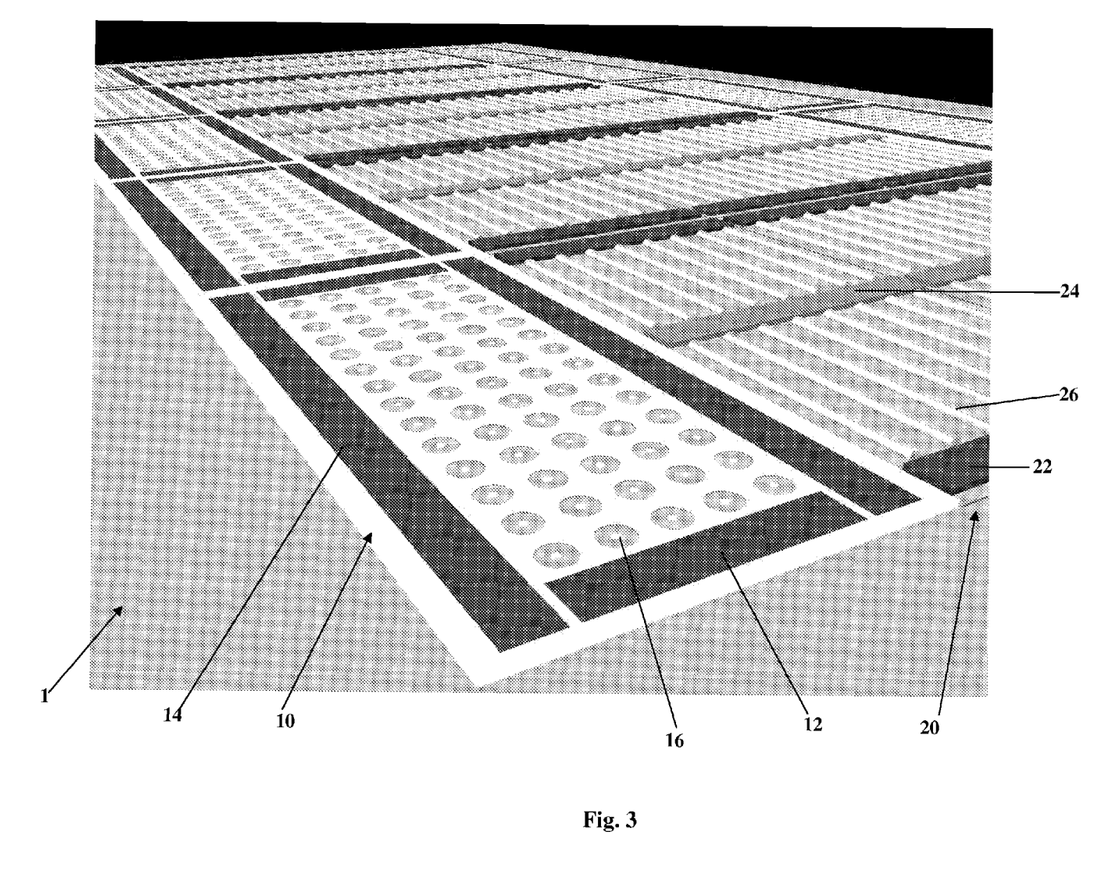
FIG. 3 is an expanded side schematic view of a storage matrix according to one or more embodiments of the present invention.

Each cell module, whether an outer row cell module 10 or an inner cell module 20, is a permanent structure embedded in or securely mounted to the floor of a storage matrix 1. In the embodiments of FIGS. 1-3, the cell modules define a substantially flat rectangular plate structure, but other shapes and dimensions are also possible. Although the cell modules are permanent structures, it is contemplated that they may be removed from the floor, for example, if it is necessary to detach the modules from the floor for repair or replacement. In accordance with the embodiment of FIG. 1, the storage matrix 1 comprises two types of cell modules: outer row cell modules 10 and inner row cell modules 20. The outer row cell modules 10 comprises motors 12, 14 arranged along both planar axes of the storage matrix 1, e.g. the X and Y axes as shown in FIG. 1. By having motors disposed along both planar axes, the outer row cell modules 10 are operable to move the carrier bi-directionally within the storage matrix 1. In contrast, the inner cell modules 20 comprise at least one motor 22 disposed along one of the planar axes, for example, the Y axis as shown in FIG. 1. By having motors disposed along only one planar axis, the inner row cell modules 20 are operable to move carriers uni-directionally within the storage matrix 1.

In an exemplary embodiment, the motors of the inner row cell modules 20 and the outer row cell modules 10 may comprise linear synchronous motors, for example, short drive linear synchronous motors, long drive linear synchronous motors, or combinations thereof. In a further embodiment, the motors may comprise iron-core linear synchronous motors, for example, and not by way of limitation, the IC55-250 Direct Drive Linear Synchronous Motor Assembly manufactured by Kollmorgen.

Figure 6A:
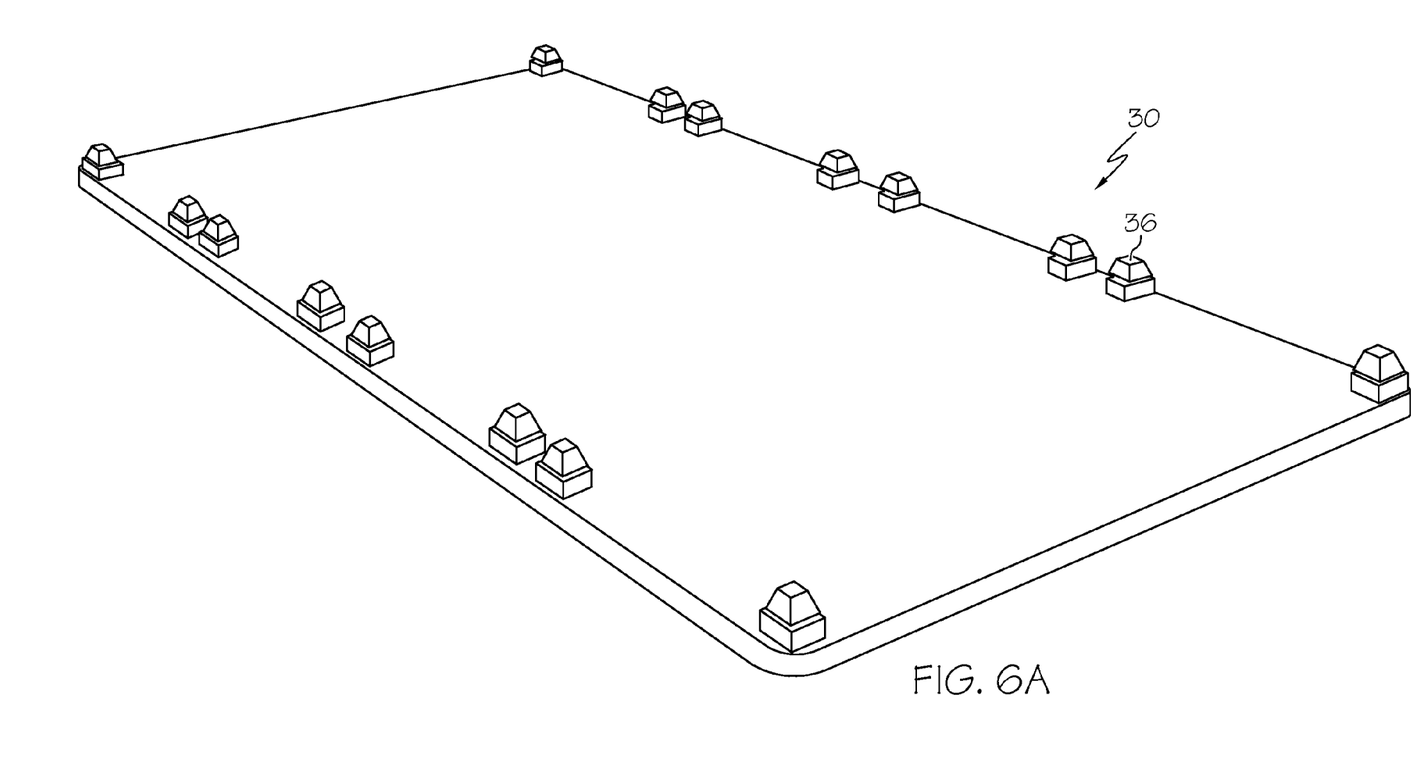
FIG. 6a is a schematic view of a topside of a carrier according to one or more embodiments of the present invention.
Figure 6B:
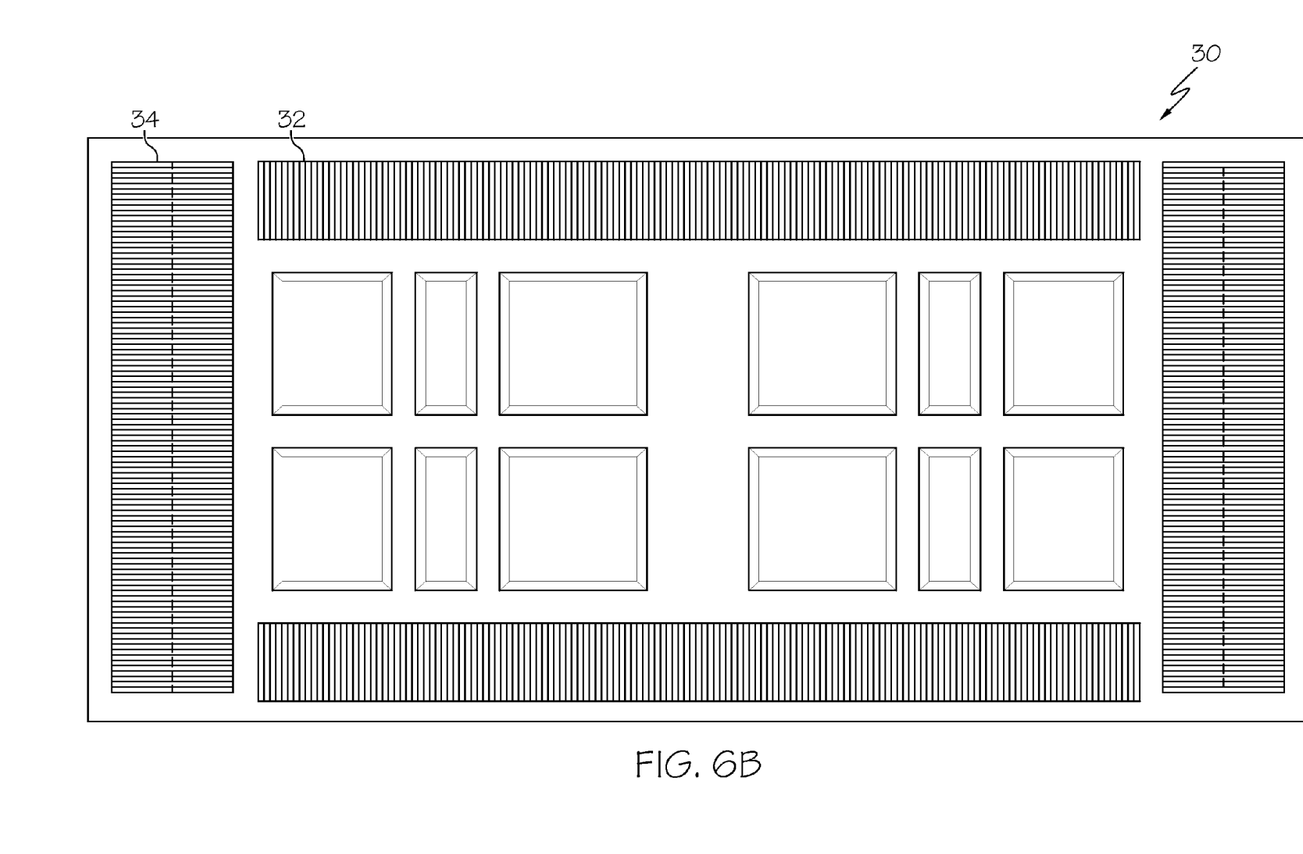
FIG. 6b is a schematic view of an underside of a carrier according to one or more embodiments of the present invention.

Referring to FIGS. 6a and 6b, the storage matrix 1 also comprises a plurality of carriers 30 configured to couple with a cell module in the storage area matrix 1. Like the cell modules 10, 20, the carriers 30 define a substantially flat rectangular plate structure. Referring to FIG. 6b, the carriers 30 comprise at least one magnet 32, 34 disposed on an underside of the carrier 32. The carriers may comprise various sizes as desired by the user, or as dictated by the storage area in which the carriers are incorporated. The magnets 32, 34 are configured to engage the motors of the inner row cell modules 10 or outer row cell modules 20 to secure the carriers 30 to the respective module when the carriers 30 are at a stationary position. The magnets 32, 34 comprise various materials suitable to magnetically couple to a motor, for example, lanthanides, metals, transition metals, metalloids, and combinations thereof. The magnetic coupling stabilizes the carrier and attached payloads thereon under dynamic loads, including environmental loads such as those due to ship motion in high sea states via magnetic attraction between the permanent magnets on the underside of the moving carrier and the stationary iron-core linear electric motors or the ferrous metal plates. In an embodiment, the magnets 32, 34 may comprise neodymium, iron, and boron. Suitable magnets may include the MC250 neodymium-iron-boron permanent magnet way produced by Kollmorgen, and which may be used with the ICC-250 iron core linear synchronous motors of the cell modules 10, 20.

As shown in the embodiment of FIG. 6b, the carriers 30 may comprise at least one long drive (X axis) magnet 32 that engages the X axis linear motor 14 of the outer row cell module 10, and may also comprise at least one short drive (Y axis) magnet 34 that engages a Y axis linear motor 12 of the outer row cell module 10 or a Y axis linear motor 22 of the inner row cell module 20. When coupling the carriers 30 to the outer row cell modules 10, arranging the short drive magnets 34 and long drive magnets 32 on the four sides of the carrier 32 ensures that the carriers 30 are firmly secured in multiple directions. This is especially beneficial when the carriers are inside a storage area 1 of a ship that pitches and yaws unpredictably at sea. When coupling the carriers to the inner cell modules 20, the inner row cell modules 20 may not provide a sufficient down-force to stabilize a payload disposed thereon, because the inner row cell modules 20 only comprise motors along one planar axis.

Consequently, the inner row cell modules 20 may comprise a metal plate 24, for example a ferrous metal plate, as shown in FIGS. 1-3. The metal plate 24 is capable of providing a downward force to stabilize a payload disposed on a carrier 30 by magnetically coupling to the magnets of the carrier 30, for example, the long drive magnet 32 of the carrier. The metal plate 24 may comprise various metal materials known to one of ordinary skill in the art. For example, and not by way of limitation, the metal plate may comprise steel, iron, or combinations thereof. In one exemplary embodiment, the metal plate 24 may be arranged parallel to and between a pair of motors 22.

In addition to securing the carriers 20, the motors of the inner row cell module 20 and the outer row cell module 10 are also configured to transfer a carrier from one cell module to another cell module. As stated above, due to the placement of the motors, the outer row cell modules 10 may move the carriers 30 bi-directionally, whereas the inner row cell modules 10 may move the carriers 30 uni-directionally. When a carrier 30 is present on an outer row cell module 10, the linear synchronous motors 12, 14 deliver a thrust force in the X and Y direction, which decouples the carrier magnets 34, 32 from the motors 12, 14, respectively, and moved the carrier in either planar axis to an adjacent inner or outer row cell module. When a carrier 30 is present on an inner row cell module 20, the linear synchronous motors 22 delivers a thrust force in only one planar axis, e.g. the Y axis, which decouples the carrier magnets 34 from the motors 22, and move the carrier in only one planar axis, e.g. in the Y direction to an adjacent inner or outer row cell module.

This uni-directional movement of the inner row cell modules 20 modifies the movement sequence, which is modeled after the sliding puzzle principle. FIGS. 5a and 5b provide an example of the movement sequence (steps 1-20) in which carriers move from an unloading/loading area 50 to another location in the storage matrix 1. In contrast to the zigzag path of the sliding puzzle principle, the carriers 30 may move in a rectangular circulation pattern through the storage matrix as shown in FIGS. 5a and 5b. By limiting the movement flexibility of many of the cell modules, the carrier movement scheme may require more movement steps; however, the minimal increase in steps is offset by the reduced costs in reducing the amount of linear motors in the system. In addition to the costs of purchasing and installing linear synchronous motors on all sides of the cell modules, the energy costs required to produce the motor thrust force in both the X and Y directions is also significant. Consequently, eliminating motors, e.g. X axis motors, on the inner row cell modules 20 may greatly reduce system costs.

To reduce friction as a carrier 30 slides from one cell module to another and thereby further reduce the required amount of thrust, the outer row cell modules 10 and the inner row cell modules 20 may both comprise friction-reducing surfaces. The friction reducing surfaces may comprise any suitable material operable to minimize sliding friction as a carrier or another vehicle moves over the cell modules 10 or 20. In one exemplary embodiment, the friction reducing surfaces may comprise a fluoropolymer material, such as PFA or PTFE. In another exemplary embodiment, the friction reducing surfaces may comprise Rulon®. Alternatively, the bearings may also comprise ball transfer units or air bearings. As shown in FIG. 3, the outer row cell module 10 may comprise plenums 16 or openings. To produce a substantially frictionless air bearing surface on the top surface of the outer row cell module 10, air is delivered through these plenums 16, for example, via air bearing nozzles (not shown) and air supply lines (not shown) contained within the outer row cell module 10. Referring to the embodiment of FIG. 3, the inner row cell modules 20 comprise roller bearings 26, which are generally lightweight and non-powered, resulting in reduced system weight and cost. In a further embodiment, the roller bearings 26 are arranged perpendicular to and between a pair of motors 22.

Figure 4:
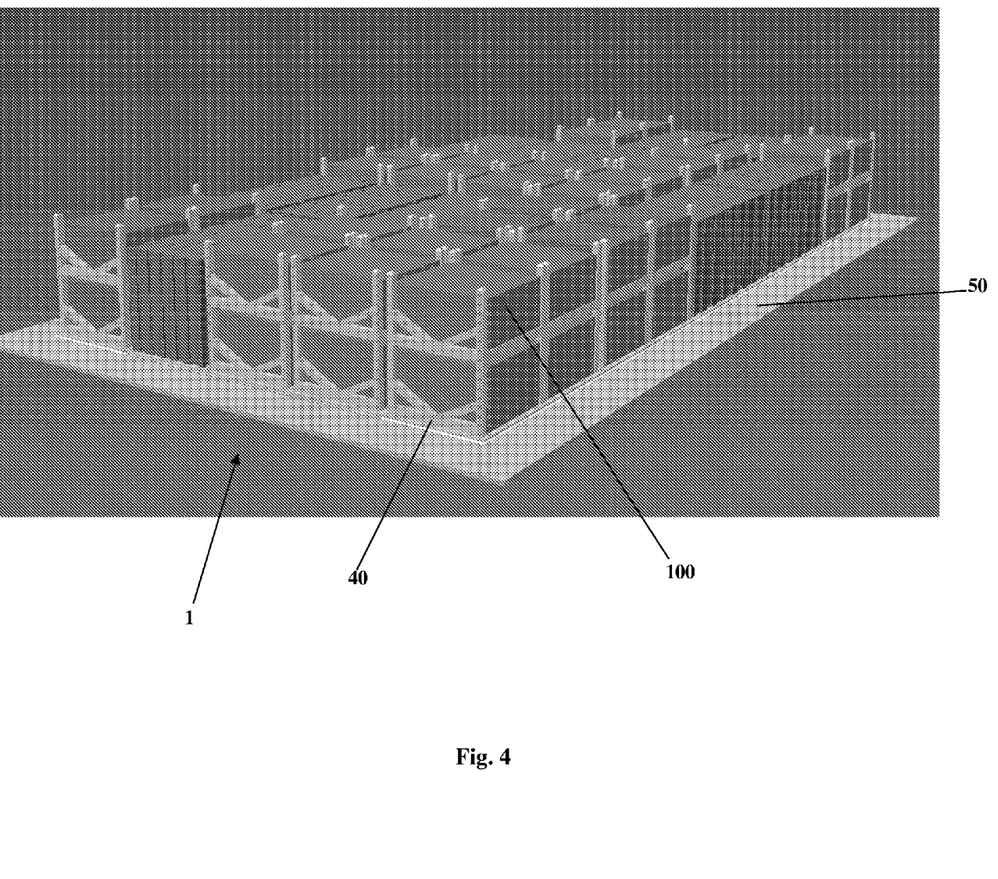
FIG. 4 is a perspective schematic view of a storage matrix comprising a plurality of carriers and payload interfaces thereon according to one or more embodiments of the present invention.

Referring to the embodiment of FIG. 6a, the carrier 30 may comprise at least one engagement mechanism 36 disposed on a top side of the carrier 30 for coupling with a payload interface 40. The engagement mechanism 36 may comprise any suitable component for coupling with one or more payload interfaces 40 at various locations along the carrier surface 30. For more details on the payload interfaces as shown in FIG. 4 and other components of the storage and retrieval system, please review U.S. Pat. No 6,842,665, and U.S. patent application Ser. No. 11/552,845, which are incorporated by reference herein, in its entirety.

It is noted that terms like "specifically," "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A storage matrix comprising:
   a plurality of stationary cell modules arranged within the storage matrix, wherein the cell modules disposed along the outer rows of the matrix comprise a plurality of motors arranged along both planar axes of the storage matrix, and the cell modules disposed along the inner rows of the matrix comprise at least one metal plate and at least one motor disposed along one of the planar axes of the storage matrix; and
   a plurality of carriers comprising at least one magnet disposed on an underside of each of the carriers, the at least one magnet being configured to engage a motor on the inner row cell modules or the outer row cell modules, wherein the plurality of motors of each outer row cell module is configured to move the respective carrier bi-directionally within the storage matrix and is also configured to stabilize the respective carrier when the carrier is moving or at a stationary position, and the at least one motor of each inner row cell module is configured to move the respective carriers uni-directionally within the storage matrix and the at least one metal plate of each inner cell module is configured to stabilize the respective carrier when the carrier is moving or at a stationary position.

2. A storage matrix according to claim 1 wherein the storage matrix comprises at least one cell module without one of the carriers disposed thereon.

3. A storage matrix according to claim 1 wherein each of the carriers comprises at least one engagement mechanism disposed on a top side of each of the carriers.

4. A storage matrix according to claim 3 further comprising at least one payload interface configured to support a desired payload, wherein the at least one payload interface comprises at least one engageable mechanism configured to couple with the at least one engagement mechanism of the carrier.

5. A storage matrix according to claim 1 wherein the motors associated with both the inner row cell modules and the outer row cell modules are linear synchronous motors configured to engage the magnets by magnetic coupling.

6. A storage matrix according to claim 1 wherein the at least one metal plate of each inner row cell module is configured to engage at least one magnet by magnetic coupling 7. A storage matrix according to claim 1 wherein the at least one magnet comprises lanthanides, metals, transition metals, metalloids, and combinations thereof.

8. A storage matrix according to claim 1 wherein the at least one metal plate comprises steel, iron, or combinations thereof.

9. A storage matrix according to claim 1 wherein the inner row cell modules comprise roller bearings.

10. A storage matrix according to claim 1 further comprising loading/unloading stations adjacent one or more of the inner row cell modules.

* * * * *